United States Patent Office 3,810,877
Patented May 14, 1974

3,810,877
POLYACID HALIDE MODIFIED COPOLYMERS OF VINYLPYRIDINES AND ACRYLAMIDE OR METHACRYLAMIDE
Richard C. Doss, Bartlesville, Okla., assignor to Phillips Petroleum Company
No Drawing. Filed Feb. 18, 1972, Ser. No. 227,657
Int. Cl. C08f 15/02
U.S. Cl. 260—78.4 D
10 Claims

ABSTRACT OF THE DISCLOSURE

Sewage and water are chemically conditioned with polyacid halide modified copolymers of vinylpyridine with acrylamide or methacrylamide. Coagulation, flocculation, and filtration in sewage and water treatment processes are significantly improved by the use of the aforesaid modified copolymers.

---

This invention relates to new polyacid halide modified vinylpyridine copolymers, to a new method of sewage and water treatment with polyacid halide modified vinylpyridine copolymers.

During the past decade chemical conditioning of sewage and water with high molecular weight organic molecules has become commercially important. Various polymer types can be substituted for coagulant aids in water treatment, such as ferric chloride or ferric sulfide and lime in order to improve water treatment processes. In general, nonionic polymers if employed alone or in addition to the aforesaid coagulant aids improve efficiency of water treatment to a slight degree. Other polymer types such as certain cationic or anionic polymers, when used in small amounts produce conditioned sewage and/or water that permit solids in sewage and water to be coagulated, flocculated or filtered under highly efficient economical processing conditions. With the ever increasing density of population and industrial expansion, the need for efficient water and sewage treatment continues to grow rapidly. Accordingly, the search continues for highly efficient economical water and sewage chemical conditioners.

It is an object of this invention to provide modified high molecular weight copolymers suited to chemical treatment of sewage. Another object is to provide modified high molecular weight copolymers suited to chemical treatment of water. Another object is to provide improved methods for the separation of solid matter from liquid matter during processing of sewage. Still another object is to provide improved methods for separating solid matter from liquid matter in water treatment operations. A further object is to provide modified high molecular weight copolymers that are economically and commercially important in the treatment of water and sewage derived from municipal and industrial waste. Other objects will be apparent from the specification and the appended claims.

In accordance with this invention it has been found that polyacid halide modified vinylpyridine copolymers are advantageously employed in sewage and water treatment. It has also been found that the efficiency of separation of solid matter from liquid matter is significantly improved when sewage and water treatment processes employ polyacid halide modified vinylpyridine copolymers. These modified vinylpyridine copolymers increase the settling rate of solids and make easier the removal of such solids in filtration and centrifugation processes.

Among the vinylpyridine copolymers that can be employed in the preparation of the modified vinylpyridine copolymers which are useful in accordance with this invention are unmodified vinylpyridine copolymers that contain recurring units that can be represented by the following formulas:

(I) 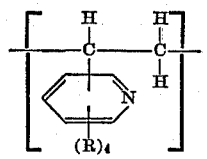

wherein each unit R independently is selected from hydrogen and alkyl groups, preferably having from 1 to 7 carbon atoms per alkyl group; the total number of carbon atoms in all of the R groups in each recurring unit (I) being 0 to about 12;
and (II) 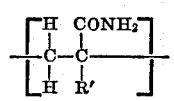

wherein R' is hydrogen or methyl. Preferably the unmodified vinylpyridine copolymers employed in this invention exhibit an inherent viscosity of about 0.5–12 when measured at 30° C. in a 0.2 molar aqueous sodium chloride solution at a polymer concentration of 0.01 gram per 100 milliliters of solution.

The unmodified vinylpyridine copolymers, containing recurring units identified by Formulas (I) and (II) described hereinbefore and useful in the production of the modified vinylpyridine copolymers of this invention, are readily prepared by processes well known in the art. Such processes include copolymerization of acrylamide or methacrylamide with a vinylpyridine, the copolymerization being conducted in a suitable solvent in the presence of a suitable catalyst substantially in the absence of air. For example, an aqueous solution of acrylamide, or methacrylamide, and a vinylpyridine containing a free radical-generating catalyst, preferably a water-soluble, organic or inorganic peroxide, e.g., potassium persulfate ($K_2S_2O_8$), is maintained in an inert atmosphere at a temperature within the range of about 0 to 100° C., preferably 20 to 80° C., for a time within the range of about 10 minutes to about 5 days, preferably 30 minutes to 2 days. Although the resulting copolymer can be separated from the solution, e.g., by distillation of the water or by dilution with acetone followed by filtration, the aqueous solution of the copolymer can be employed directly, without isolation of the polymer, to produce the modified vinylpyridine copolymers of this invention.

In the production of the unmodified copolymer, the vinylpyridine monomer should constitute about 1 to about 50, preferably about 3 to about 30, weight percent of the monomers used in the preparation of the copolymers, i.e., of the vinylpyridine monomer plus the acrylamide or methacrylamide monomer.

The modified copolymers of this invention, i.e., the modified copolymers of vinylpyridine and acrylamide or methacrylamide are produced by reacting the unmodified copolymers described above with a polyacid halide having the formula $R''(COX)_m$, wherein $R''$ is a valence bond or a hydrocarbon radical selected from aromatic hydrocarbon radicals and saturated hydrocarbon radicals, said radical containing 1 to about 14 carbon atoms and having a valence of $m$, X is chlorine or bromine, and $m$ is an integer of 2 to 4 with the proviso that when $m$ is more than 2, $R''$ is a hydrocarbon radical. Examples of some polyacid halides which can be employed include oxalyl chloride, malonyl chloride, succinyl bromide, glutaryl chloride, adipyl bromide, 2-methyloctanedioyl chloride, dodecanedioyl chloride, hexadecanedioyl bromide, 1,2,3-propanetri(carbonyl chloride), 1,2,3,4 - butanetetra(carbonyl bromide), 1,2,4-cyclohexanetri(carbonyl chloride), 2-methyl-1,3-cyclopentaedi(carbonyl bromide), phthaloyl chloride, isophthaloyl chloride, terephthaloyl bromide, 1,2,4-benzenetri(carbonyl chloride), 1,2,4,5-benzenetetra(carbonyl bromide), 1,4-naphthalenedi(carbonyl chloride), 4-octylphthaloyl chloride, and the like, and mixtures thereof.

In the preparation of the modified copolymer, the polyacid halide should be employed in an amount of about 0.01 to about 20 weight percent, preferably about 2 to about 12 weight percent, based on the amount of unmodified copolymer used. Although the reaction temperature can vary within a considerable range, the temperature generally will be within the range of about 10° C. to about 100° C., preferably about 20° C. to about 80° C. The reaction time can vary widely, depending in part on the reaction temperature, but generally will be within the range of about 10 minutes to about 5 days, preferably about 1 hour to about 30 hours. Although the reaction is conveniently conducted at atmospheric pressure, higher or lower pressures can be employed. The reaction is conducted in an aqueous solution, preferably essentially water, in which the unmodified as well as the modified copolymer is soluble. Although the modified copolymer can be isolated, e.g., by distillation of water or by precipitation by dilution with a substance such as acetone, it is convenient to employ the aqueous solution directly, without isolation of polymer, in the treatment of water or sewage.

The modified copolymer thus produced for use in the treatment of water or sewage should have an inherent viscosity of about 0.5 to about 12, preferably about 2 to about 8, when measured at 30° C. in a 0.2 molar aqueous sodium chloride solution at a polymer concentration of 0.01 gram per 100 milliliters of solution.

The amount of polyacid halide-modified vinylpyridine copolymer used in sewage and water treatment processes in accordance with this invention can vary over a wide range but generally will be from about 0.01 to as much as 1000 parts per million by weight, preferably about 0.1 to 500 parts per million by weight, of the total solid and liquid matter to be treated.

The term "sewage treatment" as employed herein is intended to describe or include any treatment of suspensions or solutions containing solid waste and/or liquid waste common to humans and animals, and/or inorganic matter often times associated with industrial waste products. The vinylpyridine copolymers are particularly advantageous when used in primary sewer sludge.

The term "water treatment" as employed herein is intended to describe or include the treatment of any source of water substantially free of organic matter but not chemically pure because of impurities such as dissolved mineral matter, gases, turbidity and sediment, color, taste and odors.

In general, this invention includes chemical treatment or conditioning of any water source derived from surface supplies, i.e., rivers, creeks, canals, ponds, lakes, reservoirs, or ground water supplies, i.e., deep wells, shallow wells, springs, mines or infiltration galleries.

Set out hereafter are examples which illustrate the best modes of practicing this invention. These examples are not intended to restrict the scope of this invention unnecessarily thereto.

EXAMPLE I

In the preparation of a 2-methyl-5-vinylpyridine/acrylamide copolymer, herein designated as MVP/A copolymer, 10 g. of 2-methyl-5-vinylpyridine, 90 g. of acrylamide, 0.100 g. of potassium persulfate, and 400 g. of water (previously boiled and cooled) were charged to a polymerization bottle. The bottle was then sealed, and the mixture was shaken at 50° C. for 25 hours. An aliquot of the resulting aqueous solution of MVP/A copolymer was diluted with acetone, and the mixture was agitated in a Waring Blender, to obtain the MVP/A copolymer as a solid white polymer having an inherent viscosity of 4.27 when measured at 30° C. on a 0.2 molar aqueous sodium chloride solution at a polymer concentration of 0.01 g. per 100 ml. solution.

In the preparation of an isophthaloyl chloride-modified 2-methyl-5 - vinylpyridine/acrylamide copolymer, herein designated as I–MVP/A copolymer, a mixture of 37.9 g. of the aqueous solution of MVP/A copolymer containing 7.58 g. of the polymer, 500 g. of water, and 0.645 g. of isophthaloyl chloride was rolled mechanically for 16 hours at about 25° C., after which the mixture was warmed at about 40–80° C. for 1 hour. The mixture was then cooled and diluted with acetone. The resulting mixture was agitated in a Waring Blender and filtered to give the desired I–MVP/A copolymer as a white solid having an inherent viscosity of 4.59 when measured at 30° C. on a 0.2 molar aqueous sodium chloride solution at a polymer concentration of 0.1 g. per 100 ml. of solution.

The above I–MVP/A copolymer was evaluated as a flocculant for kaolin clay, which was employed as a 1 weight percent suspension in water. In this test the settling rate of the kaolin clay was determined upon use of each of three concentrations of the I–MVP/A copolymer. Comparative tests were conducted in which the unmodified MVP/A copolymer was employed or in which no flocculant was used. When a flocculant was employed, a measured amount of an aqueous 0.1 weight percent solution of the flocculant was added to 100 ml. of the suspension in a 100-ml. graduated cylinder, and the cylinder was stoppered. The cylinder was then inverted twenty times, after which the flocculated solid material was allowed to settle. Determined then was the time required for the flocculated clay to settle to the extent that the volume of the supernatant liquid above the flocculated clay was equal to 50 ml. The settling rate, defined herein as the average rate at which the flocculated clay settled during the time required for clarification of the upper 50 ml., and expressed in ml./minute, was calculated by dividing 50 ml. by the settling time requirement in minutes. The results of these tests are summarized in Table I.

TABLE I

| Flocculant | Settling rate, ml./min. | | | |
|---|---|---|---|---|
| | 0 p.p.m. | 1 p.p.m.[1] | 2 p.p.m.[1] | 4 p.p.m.[1] |
| I–MVP/A copolymer | | 37 | 59 | 144 |
| MVP/A copolymer | | 24 | 40 | 83 |
| None | 8 | | | |

[1] Parts of flocculant, by weight, per million parts of aqueous kaolin clay suspension.

The results in Table I show clearly the effectiveness of the I–MVP/A copolymer as a flocculant, the use of this copolymer at each of the concentrations employed providing vastly greater settling rates of the kaolin clay than were obtained in the absence of a flocculant, and decidedly faster settling rates than were obtained with the MVP/A copolymer.

EXAMPLE II

In a series of tests, the rate of vacuum filtration of sludge from a municipal water treatment plant and of primary sewer sludge was measured, using as a flocculant the I–MVP/A copolymer of Example I or the MVP/A copolymer of Example I. Tests were also conducted in which no flocculant was employed. The sludge from a municipal water treatment plant was an aqueous suspension containing about 0.5–0.8 weight percent solids. The primary sewer sludge was an aqueous suspension obtained from the primary clarifier (settling basin) of a municipal sewer system; this sewer sludge contained 5–8 weight percent solids. When employed with the municipal water treatment plant sludge, each copolymer was used at a concentration of 150 parts by weight per million parts of sludge. When employed with the primary sewer sludge, each copolymer was used at a concentration of 200 parts by weight per million parts of sludge. The vacuum filtration tests were conducted by first mixing the copolymer, when employed, with 100 ml. of the sludge is a graduated cylinder by inverting the stoppered cylinder twenty times. The mixture was then poured into a Büchner funnel (2.25 in. diameter) and filtered under vacuum (29 in. water) through a No. 2 Whatman filter paper. The filtrate volume was noted at various time intervals. When the filtration rate was very slow, e.g. greater than 1 hour, the rate was determined at the end of 30 minutes by dividing the filtrate volume in ml. by 30 minutes. When the filtration rate was more rapid, the rate was based on the time required to produce 50 ml. of filtrate. The results of these tests are summarized in Table II.

TABLE II

| Flocculant | Vacuum filtration rate, ml./min. | |
| --- | --- | --- |
|  | Municipal water treatment plant sludge | Primary sewer sludge |
| I-MVP/A copolymer | 135 | 50 |
| MVP/A copolymer | 35 | 33 |
| None | 2.6 | 0.8 |

As shown in Table II, the use of the I–MVP/A copolymer vastly improved the vacuum filtration rate of the municipal water treatment plant sludge and the primary sewer sludge. Furthermore, the I–MVP/A copolymer was much more effective than the MVP/A copolymer in facilitating vacuum filtration.

The increased efficiency in the removal of solids from liquid matter in sewage and water treatment processes by use of modified vinylpyridine copolymers as described herein can be employed in any process common to the art for water and sewage treatment. Illustrative of common sewage treatment operations include primary and secondary clarification operations, sludge conditioning of activated sludge, raw sewage, digested sewage, digested activated sewage, or raw plus activated sewage. Any method of separating solids from liquids can be employed in the practice of this invention including filtration by the use of filter trays, centrifugation, flotation thickening, sludge bed drawing and the like. Other processes and process equipment as well as other applications of this invention will be apparent to those skilled in the art.

That which is claimed is:

1. A polyacid halide modified vinylpyridine copolymer consisting essentially of the reaction product of an unmodified copolymer containing recurring units represented by the following formulas:

(I) 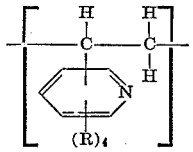

wherein each unit R independently is selected from hydrogen and alkyl groups; and (II) 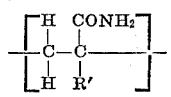

wherein R' is hydrogen or methyl; the recurring units represented by formula (I) constitute from about 1 to about 50 weight percent of the total of the recurring units of formula (I) and the recurring units of formula (II); wherein the unmodified copolymer is modified by a polyacid halide of the formula $R''(COX)_m$ wherein X is chlorine or bromine, R'' is selected from a valence bond, a saturated hydrocarbon radical, or an aromatic hydrocarbon radical, $m$ is an integer of from 2 to 4, and R'' is a hydrocarbon radical when $m$ is more than 2; the amount of said polyacid halide employed being in the range of about 0.01 to about 20 weight percent based on the amount of said unmodified copolymer, said modified copolymer having an inherent viscosity in the range of about 0.5 to about 12, when measured at 30° C. in a 0.2 molar aqueous sodium chloride solution at a polymer concentration of 0.01 gram per 100 milliliters of solution.

2. A composition in accord with claim 1 wherein said unmodified copolymer recurring units consist essentially of formula (I) units derived from 2-methyl-5-vinylpyridine and formula (II) units derived from acrylamide, and said copolymer is modified by reaction with isophthaloyl chloride.

3. A copolymer in accordance with claim 1 wherein said R' is hydrogen.

4. A copolymer in accordance with claim 1 wherein said R' is methyl.

5. A copolymer in accordance with claim 1 wherein said polyacid halide is isophthaloyl chloride.

6. A copolymer in accordance with claim 1 wherein the recurring units represented by formula (I) constitutes from about 3 to about 30 weight percent of the total of the recurring units of formula (I) and the recurring units of formula (II).

7. A copolymer in accordance with claim 1 wherein the amount of said polyacid halide employed is in the range of about 2 to about 12 weight percent based on the amount of said unmodified copolymer.

8. A copolymer in accordance with claim 1 wherein said inherent viscosity is in the range of from about 2 to about 8, when measured at 30° C. in a 0.2 molar aqueous sodium chloride solution at a polymer concentration of 0.01 gram per 100 milliliters of solution.

9. A copolymer in accordance with claim 1 wherein each said R is independently selected from the group consisting of hydrogen and alkyl groups having from 1 to 7 carbon atoms per alkyl group, the total number of carbon atoms in all of the R groups in each recurring unit of formula (I) being in the range of 0 to 12, and wherein R'' is a valence band or a hydrocarbon radical having from 1 to 14 carbon atoms with a valence of $m$.

10. A copolymer in accordance with claim 9 wherein the recurring units represented by formula (I) constitutes from about 3 to about 30 weight percent of the total of the recurring units of formula (I) and the recurring units of formula (II) wherein the amount of said polyacid halide employed is in the range of about 2 to about 12 weight percent based on the amount of said unmodified copolymer wherein said inherent viscosity is in the range of from about 2 to about 8, when measured at 30° C. in a 0.2 molar aqueous sodium chloride solution at a polymer concentration of 0.01 gram per 100 milliliters of solution.

References Cited

UNITED STATES PATENTS 2,963,396  12/1960  Padbury et al. _____ 162—168
3,269,969   8/1966  Fikentscher et al. ____ 260—29.6

STANFORD M. LEVIN, Primary Examiner

U.S. Cl. X.R.

260—20.3 N; 210—59, Dig. 20